May 23, 1933.         L. H. MESSINGER, JR         1,910,350
ATTACHMENT FOR INTERNAL COMBUSTION ENGINES
Filed April 15, 1926         2 Sheets-Sheet 1
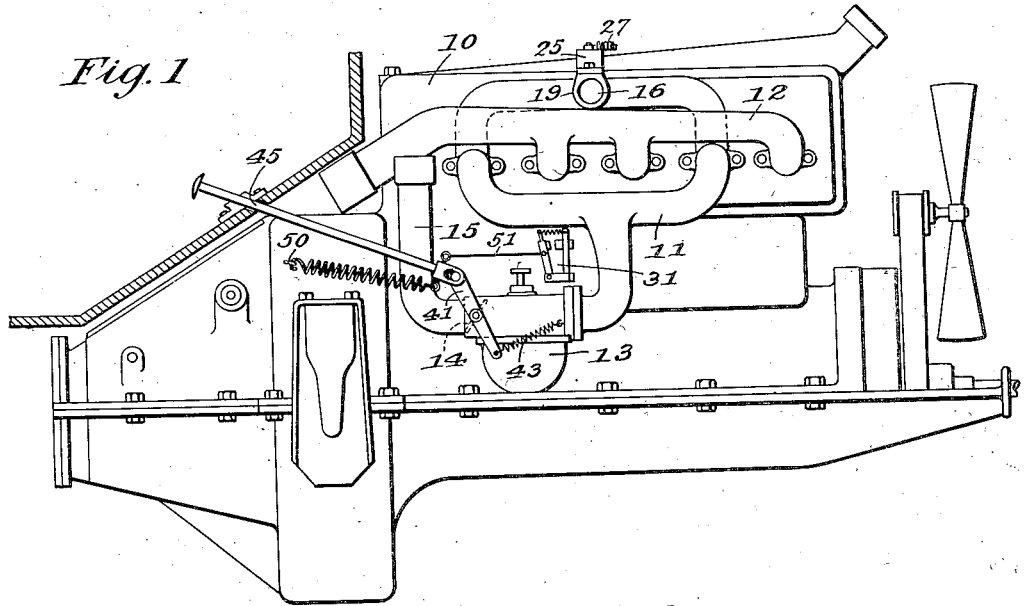
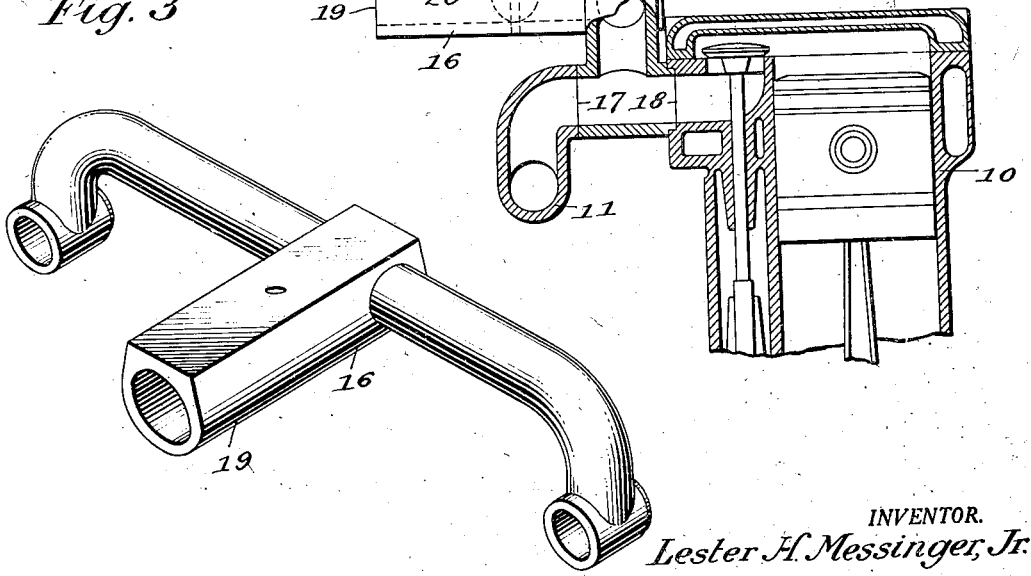
INVENTOR.
Lester H. Messinger, Jr.
BY
G. H. Braddock
ATTORNEY May 23, 1933.    L. H. MESSINGER, JR    1,910,350
ATTACHMENT FOR INTERNAL COMBUSTION ENGINES
Filed April 15, 1926    2 Sheets-Sheet 2
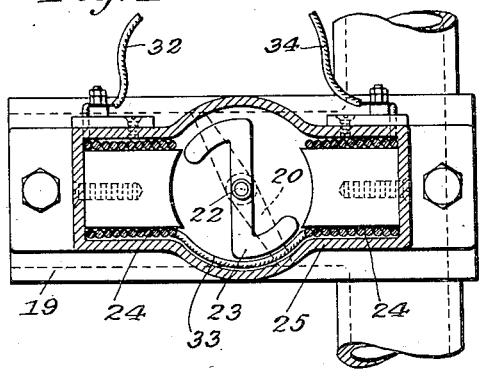
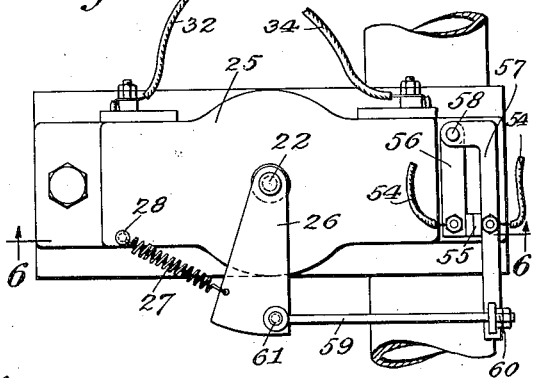
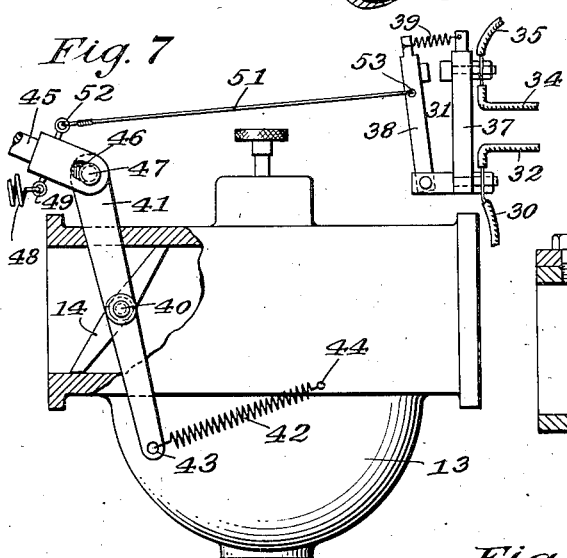
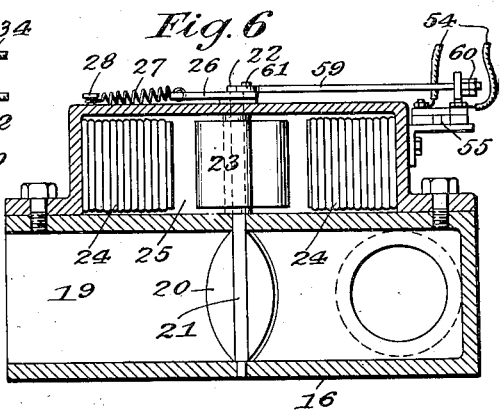
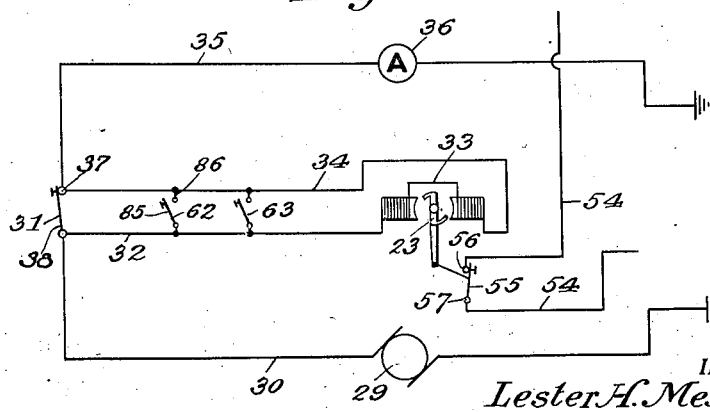
INVENTOR.
Lester H. Messinger, Jr.
BY
G. H. Braddock
ATTORNEY Patented May 23, 1933

1,910,350

UNITED STATES PATENT OFFICE

LESTER H. MESSINGER, JR., OF BRIDGEPORT, CONNECTICUT

ATTACHMENT FOR INTERNAL COMBUSTION ENGINES

Application filed April 15, 1926. Serial No. 102,347.

This invention relates to new and useful improvements in air inlet valve and carburetor by-pass valves for the intake manifold of internal combustion engines particularly automobile engines.

I have discovered that when an internal combustion engine is operating at high speed with a retarded throttle a rich mixture is drawn into the engine and not properly consumed, resulting in a waste of gasoline, the formation of large quantities of obnoxious gas and the dilution of the oil in the crank case. Amongst the other objections to the operation of the engine under the conditions and in the manner mentioned is the fact that incomplete combustion of the fuel and the drawing of excess lubricating oil into the cylinders results in large carbon deposits.

The present invention provides a means for keeping a cylinder or cylinders of an engine free of gasoline mixture at all times when conditions are not favorable to efficient combustion, and prevents the sucking of excess lubricating oil into the cylinders.

The invention will be clear from a consideration of the following detailed description taken in connection with the accompanying drawings wherein the invention in a preferred or satisfactory form is illustrated. However, it will be understood that the invention is not limited to the details disclosed but includes all such variations and modifications as fall within the spirit of the invention and the scope of the appended claims.

In the accompanying drawings forming a part of this specification,

Fig. 1 is a side elevational view showing the improvement as applied to an automotive vehicle;

Fig. 2 is a fragmentary sectional view of a cylinder and intake manifold of the engine of the vehicle, detailing, in section and elevation, parts of the improvement;

Fig. 3 is an enlarged perspective view of the auxiliary air intake manifold of the attachment;

Fig. 4 is an enlarged sectional view on line 4—4 in Fig. 2;

Fig. 5 is a plan view of the parts of the improvement disclosed in Fig. 4;

Fig. 6 is a sectional view of the attachment as on line 6—6 in Fig. 5, the parts above the magnet housing being not sectioned;

Fig. 7 is an enlarged elevational view, partially in section, detailing features of the invention;

Fig. 8 is a diagrammatic view disclosing a wiring system to be utilized in connection with the improvement.

The present invention includes a valve or valves normally closing an auxiliary air port leading to the cylinders of an internal combustion engine. This port is arranged between the engine cylinders and the carburetor and is adapted when opened to admit air to the engine cylinders practically at atmospheric pressure (explosive mixture not being admitted). Means are included to open this valve when the engine throttle is retarded and the engine is operating at greater than a predetermined speed as when a vehicle is propelling the engine or when the engine is racing. This valve opening means may be controlled directly by the engine speed or it may be controlled by vehicle speed.

Referring in detail to the drawings, 10 indicates the cylinders of an engine including an intake manifold 11, and exhaust manifold 12, a carburetor 13, a throttle valve 14, and a carburetor intake 15. An auxiliary air intake manifold 16 is arranged between the carburetor 13 and the cylinders 10 and communicates with the intake manifold at 17 and directly with the engine block at 18. The manifold 16 has an inlet 19 normally closed by a butterfly valve 20 mounted on a rotatable shaft 21. (See Figs. 2 to 6.)

Shaft 21 includes an extension 22 to which is fixedly secured an armature 23 of a magnet 24 the said armature and magnet being arranged in a housing 25 of any desired construction. As here shown, extension 22 projects at the upper side of the housing 25 and has fixed to it a lever 26 to which is secured one end of a coil spring 27 the other end of which is anchored to the housing 25 as at 28. Spring 27 tends to draw the lever 26 toward the left as viewed in Fig. 5 whereby to maintain the valve 20 in closed position. The electro-magnet when energized or when sufficiently energized acts upon the armature 23 to rotate the shaft 21 whereby to open the valve against the action of the spring and to maintain said valve open.

In Fig. 8 I have shown a wiring diagram of the improvement and in this figure 29 is the generator and 30 is a lead wire from the generator to the movable contact of a switch 31 while 32 is a lead from said switch to the magnet 24. A wire 33 connects the poles of the magnet and a wire 34 connects the magnet with the fixed contact of the switch 31 while 35 is the wire connecting said switch to the usual ammeter 36. Obviously, when the switch 31 is opened, current will flow through the magnet from the generator to the ammeter whereby the magnet will be energized and when the switch is closed the circuit will be shunted and the magnet de-energized.

The switch 31 is suitably mounted upon a vehicle of which the engine 10 forms the power plant and the switch includes a fixed contact 37, a movable contact 38 to co-operate therewith, and a coil spring 39 normally urging the movable contact toward the fixed contact to close the circuit. Throttle valve 14 is fixed to a shaft 40 to which is also fixed a throttle valve actuating lever 41. An end 43 of a coil spring 42 is secured to the said lever 41 and the end 44 of said spring is anchored to a part of the carburetor whereby said spring normally urges the throttle valve to closed or retarded position.

A throttle actuating rod 45 is suitably mounted upon the vehicle and in its lower end has an elongated slot 46 pivotally and slidably receiving a pin 47 on the upper end portion of the lever 41. Fixed to the rod 45 at 49 and to a part of the engine at 50 is a coil spring 48 normally urging the rod 45 rearwardly to maintain the lower end of the slot 46 in engagement with the pin 47. An end 52 of a cable or rod 51 is secured to the throttle actuating rod and the end 53 of said cable is secured to the pivoted switch contact element 38. Cable or rod 51 serves normally to hold the contact 38 out of engagement with contact 37, the spring 48 being stronger than the spring 39.

Preferably the spring 48 is stronger than the spring 42 whereby considerable pressure will be required to move the rod 45 ahead to permit the switch 31 to be closed by the spring 39. With such an arrangement the switch will not be accidentally closed as for example by the weight of the foot when this is not intended.

From the foregoing, it will be apparent that the circuit including the generator and the ammeter will also include the magnet 24 at all times when the throttle is retarded so that the switch 31 is open. Under these circumstances, that is, when a throttle is so retarded, the auxiliary air inlet valve will be opened provided the magnet is energized to a sufficient extent to overcome the action of the spring 27. The magnet may have this power under any desired conditions.

The magnet may be stronger than the spring while the engine speed is above a predetermined speed, (it being understood that the generator speed is the same as that of the engine) and the spring 27 can act when the engine speed is below such predetermined speed and the current out-put from the generator has been reduced by slowing of the generator and there is not sufficient current to overcome the pull of the spring. This predetermined speed would ordinarily be that speed just above that at which the engine idles whereby when the engine is operating above idling speed with the throttle retarded, as when a vehicle is driving the engine or the engine is otherwise racing, the auxiliary air inlet valve is open but at all other times is closed.

The elongated slot 46 provides means whereby when the throttle actuating rod is advanced the contact 38 engages the contact 37 to shunt the circuit away from the magnet prior to the opening of the throttle valve whereby to close the auxiliary air inlet valve before opening the throttle valve to thus insure a feed of gaseous fuel at the beginning of the opening of the throttle valve.

When the valve 20 is opened, the ignition circuit of the engine should also be opened. In the diagrammatic view the ignition circuit is indicated at 54 and includes a switch 55 adapted to be actuated with the valve 20. The manner of actuation of this switch is shown in Figs. 5 and 6 and in these figures 56 is the fixed contact of switch 55 and 57 is the movable contact thereof, the said movable contact being pivoted at 58. A connecting rod 59 is secured at 60 to the contact 57 and at 61 to the lever 26 whereby when the valve 20 is closed the contacts 56 and 57 are engaged and whereby said contacts are moved apart to break the ignition circuit as the valve 20 starts to open.

At times when the throttle is retarded and the engine is being propelled by a vehicle it may be found desirable to close the valve 20. This would happen when it is desired to utilize the vacuum or suction in the intake manifold to do work, such as actuate a booster brake or operate a windshild wiper. To accomplish the desired result it is but necessary to actuate the throttle lever within the limits of slot 46 to permit the switch 31 to close without opening the throttle valve. The same result could be obtained by actuating other switches such as the switches 62 and 63 of Fig. 8 to shunt the circuit from wire 32 to wire 34. When a booster brake is to be actuated switch 62 could be closed and the switch 63 could be closed when a vacuum or suction operated windshield wiper is to be set into operation.

These switches might be ordinary switches arranged for manual actuation or for actuation from the brake actuating means or the windshield wiper starting means.

The reason for placing the auxiliary intake manifold close to the cylinders and at great distance from the carburetor is to preclude the possibility of drawing gaseous fuel into the cylinders when the auxiliary inlet is open to take in atmospheric air, and to insure that any gaseous fuel which may be in the intake manifold when said auxiliary-air-inlet is opened will not be carried along with the atmospheric air entering through said auxiliary-air-inlet.

It will be evident that the keeping of gasoline out of the cylinders when a vehicle is propelling an engine or the engine is racing and there is no need for utilizing gasoline to accomplish propulsion, saves gasoline, and, in addition to this, the furnishing of air approximately at atmospheric pressure to the cylinders under the light load working conditions which exist therein when the engine is propelled by a vehicle or is racing, provides pressure in the cylinders preventing the drawing of lubricating oil into the combustion chambers.

While I have preferred to disclose the magnet 24 as the special device adapted to actuate the valve 20 it is to be understood that other devices could be substituted.

What I claim is:

1. In an internal combustion engine, a carburetor, a cylinder, an intake manifold between said carburetor and cylinder, a throttle, throttle actuating means, air inlet means in said intake manifold, means holding said air inlet means in closed position, mechanism responsive to the speed of the engine to open said air inlet means when the speed exceeds a predetermined value, and means operated by the throttle actuating means to interrupt the operation of said mechanism when said throttle is open wider than the idling position.

2. In an internal combustion engine, a carburetor, a cylinder, an explosive mixture intake manifold with which said carburetor communicates, an air intake manifold between said explosive mixture intake manifold and said cylinder, the air intake manifold being spaced from said carburetor, a throttle, throttle actuating means, an air inlet in said air intake manifold, valve means for said air inlet, means holding said valve means to close said air inlet, mechanism responsive to the speed of the engine to open said air valve when the speed exceeds a predetermined value, and means operated by the throttle actuating means to interrupt the operation of said mechanism when said throttle is open wider than the idling position.

3. In an internal combustion engine, a carburetor, a cylinder, an intake manifold between said carburetor and cylinder, a throttle, throttle actuating means, air inlet means in said intake manifold, means holding said air inlet means in closed position, mechanism responsive to the speed of the engine to open said air inlet means when the speed exceeds a predetermined value, and means operated by the throttle actuating means to close said air inlet means.

4. In an internal combustion engine, a carburetor, a cylinder, an intake manifold between said carburetor and cylinder, a throttle, throttle actuating means, an air inlet in said intake manifold, valve means for said air inlet, means holding said valve means to close said air inlet, mechanism responsive to the speed of the engine to open said air valve when the speed exceeds a predetermined value while the throttle actuating means is in the idling position of said throttle and the engine is being operated by a force other than that of the explosion of the mixture in said cylinder, and means operated by the throttle actuating means to interrupt the operation of said mechanism when said throttle is open wider than the idling position.

5. In an internal combustion engine, a carburetor, a cylinder, an intake manifold between said carburetor and cylinder, a throttle, throttle actuating means, an air inlet in said intake manifold, valve means for said air inlet, means holding said valve means to close said air inlet, mechanism responsive to the speed of the engine to open said air valve when the speed exceeds a predetermined value while the throttle actuating means is in the idling position of said throttle and the engine is being operated by a force other than that of the explosion of the mixture in said cylinder, and manually operated means to close said air inlet before said throttle is advanced beyond its idling position.

6. The combination as specified in claim 5, an ignition circuit, and means whereby said ignition circuit can be closed when said air inlet is closed and can be broken when said air inlet is open.

7. In an internal combustion engine, a carburetor, a cylinder, an intake manifold between said carburetor and cylinder, a throttle, throttle actuating means, an air inlet in said intake manifold, valve means for said air inlet, means holding said valve means to close said air inlet, mechanism responsive to the speed of the engine to open said air valve when the speed exceeds a predetermined value while the throttle actuating means is in the idling position of said throttle and the engine is being operated by a force other than that of the explosion of the mixture in said cylinder, and means manually actuatable to allow said means holding said valve means closed to function even when said throttle actuating means is in the idling position of said throttle and said engine is being propelled by a force other than explosive mixture in said cylinder, said manually actuatable means comprising a fixed contact, a movable contact, means urging said contacts toward each other, a throttle actuating rod having an elongated slot, a throttle actuating lever engaging said slot, a connection between said rod and said movable contact, and means holding said rod away from said throttle actuating lever and said movable contact away from said fixed contact, said rod being adapted to be advanced to first move relatively to said lever and allow said movable contact to engage said fixed contact, and to then be further advanced to manipulate said throttle actuating lever to open the throttle.

8. The combination as specified in claim 7, wherein said manually actuatable means to allow said means holding said valve means closed to function comprises a fixed contact, a movable contact, and a booster brake adapted to cause said movable contact to engage said fixed contact.

9. The combination as specified in claim 7, wherein said manually actuatable means to allow said means holding said valve means closed to function comprises an electric switch.

10. In an internal combustion engine, a cylinder, means for causing a feed of explosive mixture to said cylinder, an intake manifold between said explosive mixture feeding means and said cylinder, mechanism responsive to the speed of the engine for causing the feed of air to said cylinder to the exclusion of explosive mixture when the speed exceeds a predetermined value while the engine is being operated by a force other than that of the explosion of the mixture in said cylinder, and means operated by the explosive mixture feeding means to interrupt the operation of said mechanism when the explosive mixture feeding means is open wider than the idling position.

11. In an internal combustion engine, a carburetor, a cylinder, an intake manifold between said carburetor and cylinder, said carburetor being adapted to cause the feed of explosive mixture to said cylinder via said intake manifold, mechanism responsive to the speed of the engine associated with said intake manifold adapted to cause the feed of air to said cylinder via said intake manifold to the exclusion of explosive mixture when the speed exceeds a predetermined value while a force other than the explosions of the mixture in said cylinder commences to operate the engine, and means operated by the explosive mixture feeding means to interrupt the operation of said mechanism when the explosive mixture feeding means is open wider than the idling position.

12. In an internal combustion engine, a cylinder, means for causing a feed of explosive mixture to said cylinder, mechanism responsive to the speed of the engine for causing a feed of air to said cylinder to the exclusion of explosive mixture when the speed exceeds a predetermined value while the engine is being operated by a force other than that of the explosion of mixture in said cylinder, an ignition circuit, means for holding said ignition circuit closed when the explosive mixture is being fed to said cylinder, and means for causing said ignition circuit to be broken when air to the exclusion of explosive mixture is being fed to said cylinder.

13. In an internal combustion engine, a carburetor, a cylinder, an intake manifold between said carburetor and cylinder, said carburetor being adapted to cause the feed of explosive mixture to said cylinder via said intake manifold, mechanism responsive to the speed of the engine associated with said intake manifold adapted to cause the feed of air to said cylinder via said intake manifold to the exclusion of explosive mixture when the speed exceeds a predetermined value while a force other than that of the explosions of the mixture in said cylinder operates the engine, means operated by the explosive mixture feeding means to interrupt the operation of said mechanism when the explosive mixture feeding means is open wider than the idling position, an ignition circuit, means for holding said ignition circuit closed when explosive mixture is being fed to said cylinder, and means for causing said ignition circuit to be broken when air to the exclusion of explosive mixture is being fed to said cylinder.

14. In an internal combustion engine, a cylinder, means for feeding an explosive mixture to said cylinder, an intake manifold between said explosive mixture feeding means and said cylinder, mechanism for controlling said explosive mixture feeding means, mechanism responsive to the speed of the engine for causing the feed of air to said cylinder to the exclusion of explosive mixture when the speed exceeds a predetermined value, and means operated by the explosive mixture feeding means to terminate the said feed of air to said cylinder.

15. In an internal combustion engine, a cylinder, means or feeding an explosive mixture to said cylinder, an intake manifold between said explosive mixture feeding means and said cylinder, mechanism for controlling said explosive mixture feeding means, mechanism responsive to the speed of the engine for causing the feed of air to said cylinder to the exclusion of explosive mixture when the speed exceeds a predetermined value, means operated by the explosive mixture feeding means to terminate the said feed of air to said cylinder, an ignition circuit, means for holding said ignition circuit closed when explosive mixture is being fed to said cylinder, and means for causing said ignition circuit to be broken when air to the exclusion of explosive mixture is being fed to said cylinder.

16. The combination with a motor having a fuel intake, of a means controllable by the speed of the motor to dilute the fuel drawn to the motor when the motor is operating under forced momentum instead of under load and above a predetermined speed, and to arrest such fuel dilution when the motor drops below such predetermined speed.

17. The combination with a motor, a fuel supply means and an intake member between the fuel supply and the motor, the intake member having an air port, of means normally closing the air port when the motor is operating under load, and means for admitting air to the port to dilute the fuel drawn to the motor when the motor is operating only under forced momentum above a predetermined speed, and to arrest the admission of air to the port when the motor drops below such predetermined speed.

18. The combination with a motor, a fuel supply and a fuel intake between the fuel supply and motor, means to dilute the fuel drawn from the fuel supply into the motor whenever the motor is operated under forced momentum instead of under load and above a predetermined speed, such means including a normally closed air valve connected with the fuel intake, and means to open the valve and admit air to the fuel intake member whenever the motor ceases to move under load and is moved under forced momentum and above such predetermined speed, and means to close the valve and arrest such fuel dilution when the motor drops below such predetermined speed.

19. The combination with the carburetor of an engine having a throttle, of an air valve having communication with the carburetor, an electro-magnet to control the position of the valve, a generator adapted when running above a predetermined speed to energize the magnet, a shunt circuit normally closed to de-energize the electromagnet when the throttle is open and the generator running above the predetermined speed, means to open the shunt circuit when the throttle is closed and the generator is still running above the predetermined speed to thereupon energize the magnet to open the valve, the valve being then movable to closed position as soon as the generator ceases to run above such speed as will maintain the magnet energized.

20. In an internal combustion engine a carburetor, a cylinder, an intake manifold between sad carburetor and said cylinder, a throttle, throttle actuating means, an air inlet in said intake manifold, valve means for said air inlet, means holding said valve means to close said inlet, mechanism responsive to the speed of the engine to open said air valve when the speed exceeds a predetermined value only while the throttle actuating means is in the idling position of said throttle and the engine is being operated by a force other than that of the explosion of the mixture in said cylinder, an ignition circuit and means operably connected to said air valve for opening or closing the ignition circuit and air inlet simultaneously.

21. In an internal combustion engine a carburetor, a cylinder, an intake conduit between said carburetor and cylinder, said carburetor being adapted to supply explosive mixture to said cylinder through said intake conduit, mechanism responsive to the speed of the engine associated with said intake conduit and adapted to cause feed of air to said cylinder to the exclusion of explosive mixture when the speed exceeds a predetermined value, and manual means for disabling said air feed mechanism only above engine idling speeds.

22. In an internal combustion engine the combination of a cylinder, a carburetor having an air and fuel inlet, an intake conduit connected between said carburetor and cylinder and having an air port therein, a throttle for said conduit, means for operating the throttle having a normal throttle closing position, a valve for controlling the opening of said port, means for maintaining said valve closed when the engine is not operating, means for maintaining said valve open when the speed of the engine exceeds a predetermined minimum speed, means connected to the throttle operating means for disabling said valve opening means operative only when the throttle operating means is displaced from its normal throttle closing position.

23. In an internal combustion engine the combination of a cylinder, a carburetor having an air and fuel inlet, an intake conduit connected between said carburetor and cylinder and having an air port therein, a throttle for said conduit, means for operating the throttle having a normally throttle closing position, a valve for controlling the opening of said port, means for maintaining said valve closed when the engine is not operating, means for maintaining said valve open when the speed of the engine exceeds a predetermined minimum speed, means connected to the throttle operating means for disabling said valve opening means, throttle operating means having a limited movement independent of said disabling means whereby the disabling means is made operable prior to the opening of the throttle when said throttle opening means is moved from its normal throttle closing position to open the throttle.

24. The combination with an engine having a fuel intake manifold, of means controllable by the speed of the engine to eliminate suction pressure in said manifold when the engine is operating under forced momentum instead of under load and above a predetermined speed and to restore said suction pressure in the manifold when the engine drops below such predetermined speed.

25. The combination with an engine having a fuel intake manifold, a fuel supply conduit connected to the manifold and a throttle in said conduit, of means controllable by the speed of the engine to eliminate suction pressure in said manifold when the engine is operating under forced momentum instead of under load and above a predetermined speed and to restore said suction pressure in said manifold when the engine speed drops below such predetermined speed or when the throttle is advanced toward full open position.

26. In an internal combustion engine a cylinder, means for causing a feed of explosive mixture to said cylinder, an intake manifold between said explosive mixture feeding means and said cylinder, mechanism responsive to the speed of the engine for causing the elimination of suction pressure in said manifold when the engine is being operated by a force other than that of the explosion of the mixture in said cylinder, and means operated by the explosive mixture feeding means to restore the suction pressure in the manifold when the engine is driven normally by the force of the explosive mixture in said cylinder.

27. In an internal combustion engine, a cylinder, means for causing a feed of explosive mixture to said cylinder, an intake manifold between said explosive mixture feeding means and said cylinder, mechanism responsive to the speed of the engine for causing the elimination of suction pressure in said manifold when the engine is being operated by a force other than that of the explosion of the mixture in said cylinder, and means operated by the explosive mixture feeding means to restore the suction pressure in the manifold when said means is operated in a normal manner to have driving of the engine resumed by the force of the explosion of the explosive mixture in the said cylinder.

28. The combination with a motor, a fuel supply means and an intake member between the fuel supply and the motor, the intake member having an air port, of means normally closing the air port when the motor is acting under load, and means for admitting air to the port when the motor is operating only under forced momentum above a predetermined speed, and to arrest the admission of air through the port when the motor drops below such predetermined speed.

29. In combination with a motor, electrically operated means for stopping the flow of mixture to the cylinders of the motor when the accelerator or throttle is moved to closing position, and means for automatically rendering such means inactive when the engine reaches idling speed.

30. The combination with an engine having a fuel intake means and a carburetor supplying fuel to said means, of means controllable by the speed of the engine to eliminate suction pressure in said carburetor when the engine is operating under forced momentum instead of under load and above a predetermined speed and to restore said suction pressure in the carburetor when the engine drops below such predetermined speed.

31. The combination with an engine having a fuel intake manifold, a fuel supply conduit connected with said manifold, a carburetor supplying fuel to said conduit and a throttle in said conduit, of means controllable by the speed of the engine to eliminate suction pressure in said carburetor when the engine is operating under forced momentum instead of under load and above a predetermined speed and to restore said suction pressure in the carburetor when the engine speed drops below such predetermined speed or when the throttle is advanced toward full open position.

Signed at Bridgeport, in the county of Fairfield, and State of Connecticut, this 12th day of April A. D., 1926.

LESTER H. MESSINGER, Jr.